United States Patent
Gravenstein et al.

[11] Patent Number: 5,854,922
[45] Date of Patent: *Dec. 29, 1998

[54] MICRO-SEQUENCER APPARATUS AND METHOD OF COMBINATION STATE MACHINE AND INSTRUCTION MEMORY

[75] Inventors: Martin G. Gravenstein; Michael A. Vigil; Silvia E. Jaeckel, all of Colorado Springs, Colo.

[73] Assignee: Ford Motor Company, Dearborn, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 784,884

[22] Filed: Jan. 16, 1997

[51] Int. Cl.⁶ ........................................... G06F 9/22
[52] U.S. Cl. ..................... 395/595; 395/590; 395/598
[58] Field of Search ................. 395/376, 800.37, 395/571, 573, 595, 598, 590, 387

[56] References Cited

U.S. PATENT DOCUMENTS

| | | | |
|---|---|---|---|
| 4,204,252 | 5/1980 | Hitz et al. ................................. | 395/598 |
| 4,493,029 | 1/1985 | Thierbach ................................ | 395/590 |
| 4,933,897 | 6/1990 | Shankar et al. ......................... | 395/557 |
| 5,043,879 | 8/1991 | Concha et al. .......................... | 395/590 |
| 5,412,785 | 5/1995 | Skruhak et al. ......................... | 395/571 |
| 5,448,709 | 9/1995 | Chandler et al. ....................... | 395/872 |
| 5,495,469 | 2/1996 | Halter et al. ............................ | 370/212 |
| 5,590,293 | 12/1996 | Uhler et al. ............................ | 395/581 |

*Primary Examiner*—Parshotam S. Lall
*Assistant Examiner*—Viet Vu
*Attorney, Agent, or Firm*—Allan J. Lippa

[57] ABSTRACT

A micro-code sequencer apparatus (10) and method includes a state machine controller (14) and an instruction memory (24) for executing instructions and branches. The branch conditions for each state are stored in the state machine controller (14) whereas reprogrammable calculation instructions are stored in instruction memory (24). The instruction memory (24) is accessed by a program counter (20) which receives the decoded state information to determine the location of its instruction. A processor (30) processes the instruction and sends the output to a next state decoder (32) which determines the next state based on the branch conditions.

17 Claims, 2 Drawing Sheets

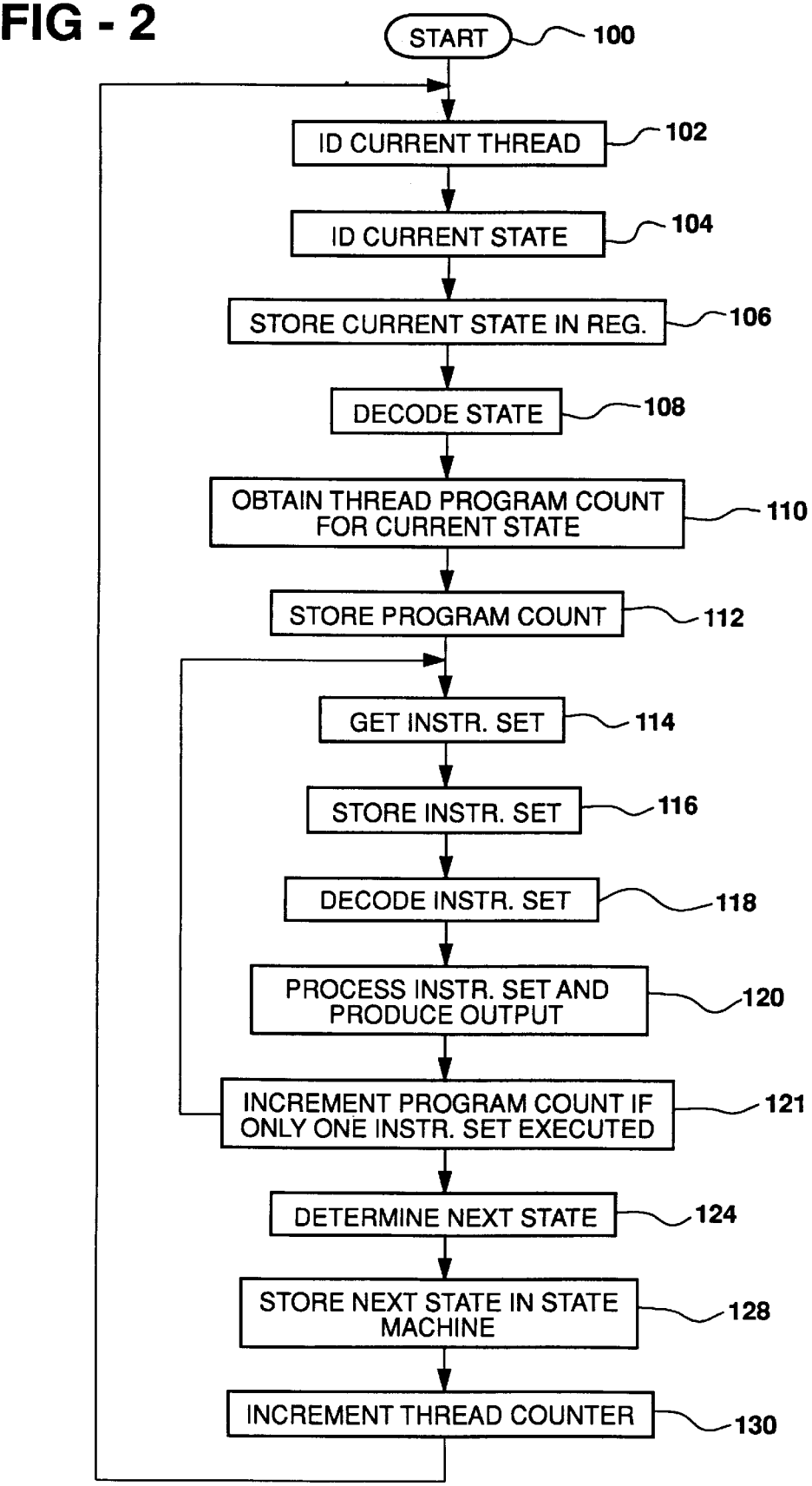

MICRO-SEQUENCER APPARATUS AND METHOD OF COMBINATION STATE MACHINE AND INSTRUCTION MEMORY

BACKGROUND OF THE INVENTION

1. Field of the Invention

The present invention relates generally to micro-sequencers for processing digital signals through a microprocessor and, more specifically, to a combination state machine and instruction memory micro-sequencer.

2. Description of the Related Art

Micro-sequencers have commonly been used to sequence through instructions and data for processor usage in the digital system, such as a computer-based system. A micro-sequencer generally consists of primarily two sections: a data path and a control unit. Existing control units can generally be classified into one of two types. The first type is a micro-code controlled sequencer, locations of which are sequenced by a counter, which provides data path control at each access implementing the intended function as a sum of sequenced data movements in the data path. The micro-code controlled sequencer could be preprogrammed and read-only or, a writable micro-code controlled sequencer which could allow different functions to be programmed making the system more suitable for general purpose. The second type involves a data path controlled by a preprogrammed state machine. As the state machine sequences through the states, control signals are provided to the data path to again implement the intended function as a sum of the sequenced data movements.

One aspect of the micro-code controlled sequencer programmed control unit is that changes to the sequence generally involve complete reconsideration of the entire micro-code controlled sequencer. This makes changing the implemented function a complex operation which is often impossible to perform in real-time due to the need to make coherent changes to the sequence.

In a state machine based control unit, the preprogrammed function can not be modified since the implemented function is contained in the hard wired logic which makes up the state machine. Thus, all functionalities to be performed must be implemented in the state machine sequences. This requirement generally leads to very large, i.e., expensive, implementation for more general purpose applications. A state machine based control unit is best used when the needed functionality is easily constrained to a specific operation and little or no real time modifications are required.

The primary elements of a micro-code controlled sequencer include an instruction counter connected both to an instruction memory and increment or branch logic. The instruction counter points to the current instruction in memory to be executed, which instruction is coded and processed by a processor. The branch logic receives the results of the processor along with the results of the branch instruction counter to determine the branch to the next instruction. The branch instruction is based upon a separate instruction received from the instruction store. The distinction of a micro-controlled sequencer is that functionality is programmed as sequences of operation entirely in the micro-code which is interpreted by the instruction decoder and branch decoder and executed by the processor.

The primary elements of a state machine controlled sequencer include a state machine connected to a next state decoder and an instruction decoder. The instruction decoder is connected to the data path which is the processor and the next state decoder receives the results from the processor to determine the next state for writing to the state machine. The distinction of a state machine controlled sequencer is that the functionality implemented must be partitioned into a sequence of data path operations. Each operation is assigned a state which is sequenced by the next state decoder. Each operation is then executed by the data path as the states are sequenced. In each state, the state machine branches to a next state based upon the results of the data path. Once implemented, the state machine controlled sequencers generally cannot be reprogrammed.

Current systems allow multiple data/multiple instruction, single data/single instruction, and multiple data/single instruction processing. Multi-thread applications have been used in supercomputers with high complexity and cost for processing multiple instructions and multiple data. The term thread refers to several algorithms to execute with data, e.g., the data and instruction combinations. Such multi-thread applications allow multiple data and multiple instructions to be processed through a single processor. In many of the multi-thread systems, the data is related and synchronous.

SUMMARY OF THE INVENTION

The present invention is a micro-sequencer apparatus. The micro-sequencer apparatus includes a state machine controller for storing a plurality of states and identifying a state as a current. The apparatus also includes a program counter for receiving the current state and producing a program count based thereon identifying a location of associated instruction. An instruction memory stores a plurality of instructions and receives the program count to identify a set of the instructions as a current instruction set. A processor performs functions of the current instruction set and produces an output. A next state decoder containing a plurality of branch conditions receives the current state and the output to determine branching to one of the plurality of states as a next state and transferring same to the state machine controller.

The present invention also includes a method of sequencing instructions. The method includes the steps of storing a plurality of states, identifying one of the states as a current state, producing a program count based on the current state, and identifying a location of associated instruction. The method also includes the steps of storing a plurality of instructions, identifying one set of the instructions as a current instruction set based on the program count, performing functions of the current instruction set and producing an output, and determining a next state from the plurality of states based on the output and the current state.

One advantage of the present invention is that it combines both the concepts of a state machine sequencer and micro-code sequencer into a new architecture with more flexibility and functionality. An additional advantage of the present invention is that smaller packaging sizes and less expense can be obtained with the micro-code sequencer of the present invention.

BRIEF DESCRIPTION OF THE DRAWINGS

The above object and advantages of the invention will be more clearly understood by reading an example of an embodiment in which the invention is used to advantage with reference to the attached drawings wherein:

FIG. 2 is a flow chart of the micro-sequencer apparatus of FIG. 1.

DESCRIPTION OF THE PREFERRED EMBODIMENT(S)

Figure 1:
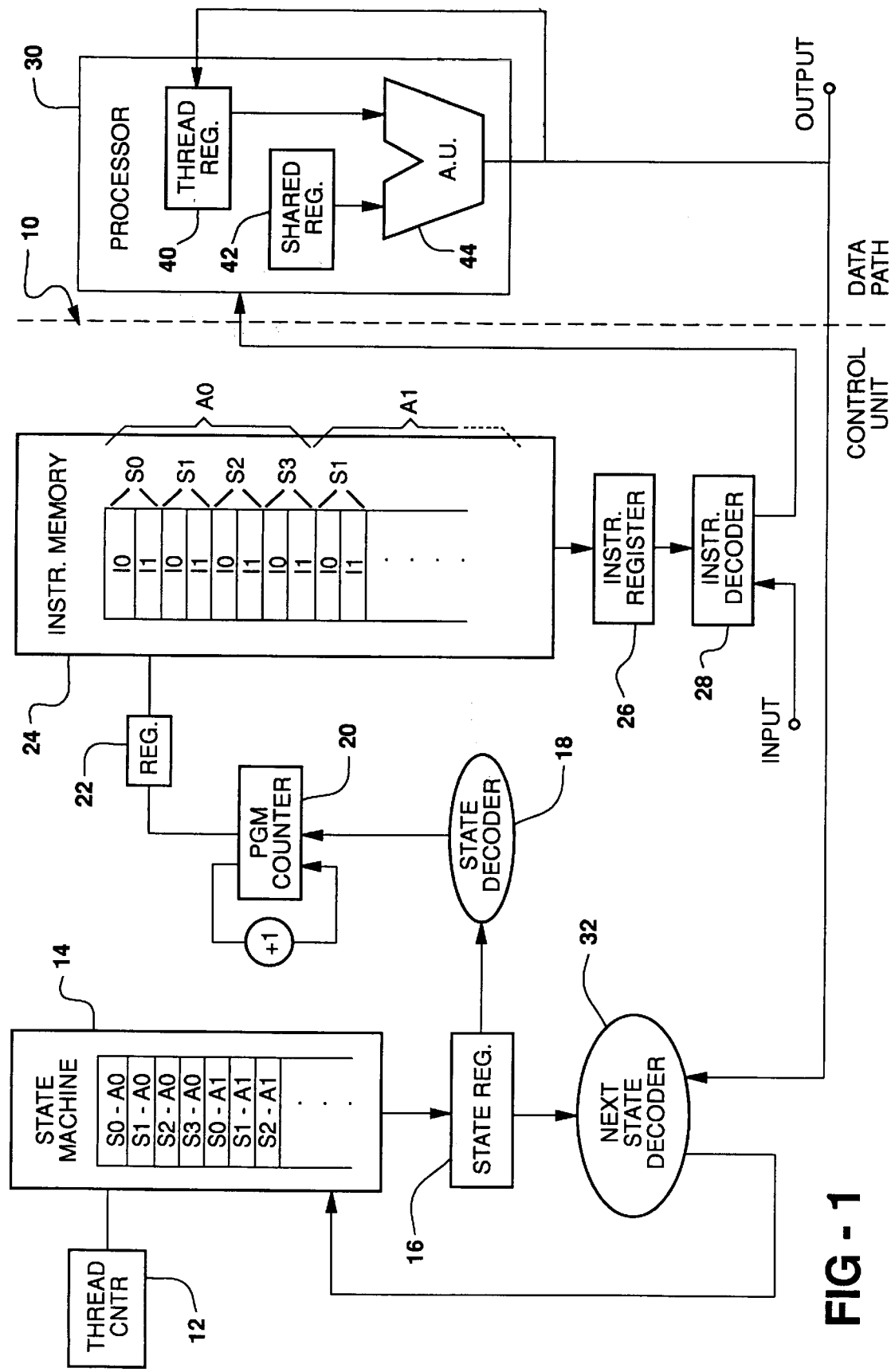
FIG. 1 is a block diagram of the micro-sequencer apparatus of the present invention.

Micro-sequencer apparatus 10 is illustrated in FIG. 1. Micro-sequencer apparatus 10 is utilized for processing multiple threads including multiple data and multiple instructions. Each thread operates independently from the other threads and utilizes the same or different algorithms for processing its own data. Though micro-sequencer apparatus 10 is shown in a multi-thread system, it is to be appreciated that micro-sequencer apparatus 10 may also be utilized as a single thread sequencer utilizing the teachings of the present invention.

Micro-sequencer apparatus 10 includes thread counter 12 for identifying a current thread from a plurality of threads to produce a thread signal representative of the current thread. The identification of the current thread allows processing of the instructions and data associated therewith, which processing is often different from the remainder of threads. Thread counter 12 also determines the subsequent sequence of each of the plurality of threads for identification as a subsequent current thread, and also identifies input associated with the current thread. Thread counter 12 may be a simple sequencer which continually sequences through each of the threads in the same order, e.g., 1, 2, 3 . . . , 1, 2, 3 Alternatively, the thread counter 12 may also be a more complex scheduling counter which bases the next thread on a defined priority or other defined sequence.

Micro-sequencer apparatus 10 also includes state machine controller 14 for storing a plurality of states which also identify a location or address of instruction, and identifying a state as a current state. In the preferred embodiment with multiple threads, a plurality of states are associated with each thread.

State register 16 is connected to state machine controller 14 for receiving and storing the current state for a particular thread. State decoder 18 is connected to the state register 16 to decode the current state for use. The decoded current state is sent to program counter 20. Program counter 20 receives the decoded current state and produces a program count based on the location or address information of the current state which identifies a location or address of an associated set of instructions. As illustrated in one embodiment, the program counter 20 includes an increment plus one loop to allow for two instruction sets to be read and processed during a cycle of a thread. It is to be appreciated that more or less than two instructions may be executed for each thread during each cycle.

Micro-sequencer apparatus 10 also includes program counter register 22 for storing the program count from the program counter 20. Instruction memory 24 stores a plurality of instructions and receives the program count from program counter 20 to identify one set of the instructions as a current instruction set associated with the current state. In one embodiment of a multi-thread system, a plurality of algorithms are stored, each algorithm having multiple instructions. Each of the threads may be associated with different algorithms or may utilize a common algorithm. However, even when using a common algorithm, each thread may be at a different program count or state. The program count provides an address to point to the current instruction in a particular algorithm in the instruction memory 24. The current instruction set is transferred to and stored in instruction register 26.

Instruction decoder 28 receives the current instruction set from instruction register 26 for decoding the instruction set along with any input for use by processor 30. Processor 30 receives the current decoded instruction set and performs the function of the current instruction set with any associated input to produce an output or result. The input may be either or both input signals for the thread and input data, as subsequently discussed. The output may be either or both the output signal and the output data, as also subsequently discussed.

Micro-sequencer apparatus 10 also includes next state decoder 32 containing a plurality of branch conditions for receiving the current state and the output to determine branching to one of the plurality of states as the next state and transferring same to the state machine controller 14. The next state decoder 32 is hardwired with branch logic to implement branch conditions based on the output and current state.

Processor 30 includes a plurality of thread registers 40, each being uniquely associated with one of the threads. Thread registers 40 include a plurality of registers associated with the different threads, and receive the thread signal to activate only those registers associated with the current thread. There may be one or multiple registers 40 associated with a single thread. This allows information to be stored for a particular thread and unused by other threads, such as input and output data.

Processor 30 also includes shared registers 42 which include a plurality of registers which may be utilized during processing of any of the threads. In other words, the shared registers 42 are not associated with any particular thread and are used during each subsequent thread processing. Therefore, information cannot be stored and retrieved by a subsequent instruction of a single thread since each thread executing an instruction in a cycle may use and overwrite the registers 42. These are merely temporary registers. Processor 30, as commonly known in the art, includes arithmetic unit 44 for processing the current instruction set with any input data. Arithmetic unit 44 operates comparisons, additions, subtractions, etc. The output of the processing may be stored in the associated thread registers 40 or produced as an output signal.

The flow chart in FIG. 2 illustrates the steps of the micro-sequencer apparatus 10. The program starts in block 100, and the current thread is identified by thread counter 12 at block 102. Thereafter, the current state is identified by state machine controller 14 in block 104. The current state is stored in state register 16 in block 106. The current state is decoded by state decoder 18 in block 108. The program count for the current state is determined by program counter 20 from the current state information in block 110. The program count is stored in register 22 in block 112. The first instruction set is obtained in instruction memory 24 in block 114. The instruction set is stored in instruction register 26 in block 116, and decoded by instruction decoder 28 in block 118. The instruction set is processed by processor 30 in block 120, and then the second instruction set is obtained by incrementing and looping back to block 114. The program count is incremented to the second instruction by program counter 20 in block 121 and branches to block 114. If two instruction sets have been executed, the program continues. Thereafter, the output is produced and current state supplied to the next state decoder 32 and the next state in block 124, and stored in the state machine controller 14 in block 128. Thereafter, the thread counter 12 is incremented in block 130 and the flowchart returns to start at block 100.

Also disclosed is a method of sequencing instructions. The method includes the steps of storing a plurality of states identifying one of the states as a current state, and producing a program count based on the current state identifying a location or address of associated instructions. The method also includes the steps of storing a plurality of instructions, identifying one set of the instructions as a current instruction set based on the program count, performing functions of the current instruction set and producing an output, and determining a next state from the plurality of states based on the output and the current state.

As an example, there may be four different threads in micro-sequencer apparatus 10. In one embodiment, thread counter 12 sequences through each of the four threads, 1, 2, 3, 4, 1, 2, . . . and performs two instruction sets for each thread at a time, and then repeats. In this manner, each thread is allowed to execute two instruction sets and then waits for the next cycle. Both state machine controller 14 and instruction memory 24 include four different algorithms A0, A1, A2, A3 which are utilized by the four threads. For example, one algorithm may determine pulse width modulation information, and a second algorithm may provide for delta time determination. As generally illustrated in FIG. 1, the instruction memory 24 contains four algorithms A0, A1, A2, A3. Within each algorithm are four sets of instructions and each set is associated with one of the states S0, S1, S2, S3 in state machine controller 14. Within each state are two instruction sets: I0, I1. In this manner, each thread executes two instruction sets I0, I1 within a single state S0, S1, S2, S3. Each algorithm has four states. It is to be appreciated that more or less instruction sets or states may be utilized, as long as each algorithm utilizes the same number. Each instruction set utilizes one data cycle or instruction cycle for execution.

An example of one of the algorithms of micro-sequencer apparatus 10 is provided herein. Algorithm A0 may provide for pulse width modulation, and may provide the following program:

```
State0:
ZD1=ZeroCheck (Time-Scratch1)
ZD2=ZeroCheck (Data[PulseWidth])
ZD3=ZeroCheck (Time-Scratch2)
ZD4=(Data[Period])
if(ZD3) {                        //Period has expired
    Data[Pulsewidth]—>Scratch1   //Store Next Pulse width
    Time—>Scratch2               //Store Current Time
    if(ZD4)State=3               //Next Period is zero
    elseif(ZD2)State=2           //Next Pulse Width is zero
    else}Assert Output
        State=1
        }
    }
elseif(ZD1)DeassertOutput        //Pulse Width has expired
State1:
Scratch1+Scratch2—>Scratch1      //Calculate expiration time of
                                   Pulse Width
ZD1=ZeroCheck (Time-Scratch1)
if(ZD1)DeassertOutput            //Pulse Width has expired
State=2
State2:
Data[Period]+Scratch2—>Scratch2  //Calculate expiration time
                                   of Period
ZD1=ZeroCheck (Time-Scratch1)
if(ZD1)Deassert Output           //Pulse Width has expired
State=0
State3:
ZD1=ZeroCheck (Data [PulseWidth])
ZD2=ZeroCheck (Data [Period])
Data [Pulsewidth]—>Scratch1
Time—>Scratch2
if(ZD1&!ZD2)State=2              //Next Period is not zero but
                                   Pulse Width is
elseif(!ZD1!&!ZD2)State=1        //Next Period and Pulse Width
                                   are not zero
```

In State 0, the first two lines are considered the first instruction set and the second two lines are considered the second instruction set. These instruction sets are stored in instruction memory 24 and selected by the program count produced by program counter 20. The remainder of State 0 is implemented by the next state decoder 32 and decoded with the output. The programmer may modify instructions I0 and I1, but cannot modify the branch conditions hard-coded in the next state decoder 32. The next state decoder 32 provides the conditions to determine whether or not a branch occurs after the completion of a state. The next decoder state 32 is hard coded with its conditions for the branch; therefore, additional instruction and fetch cycles are not needed to obtain a branch instruction from the instruction memory 24. In the example, ZD1 indicates that the predetermined pulse width time has expired. ZD2 determines whether a zero detect for the pulse width data has occurred. ZD3 determines if the set period has expired, and ZD4 checks to see if a zero detect has occurred on the period data. Once these instructions have been performed by the processor 30, the information is sent to the next state decoder 32 which performs additional checks to determine if a branch is to occur to a different state. If not ZD3 (period has expired), then ZD1 is checked. If not ZD1 (pulse width has expired), the state does not change for the thread. The temporary variables Scratch 1 and Scratch 2 are stored in thread registers 40 for use in subsequent instruction cycles. The state branching is pre-programmed and dependent on the output of processor 30. In the above example, the following branches occur:

```
State 0 → State 0 if Period time≠0
State 0 → State 1 if Period time=0, Period data≠0, and
    Pulse Width data≠0
State 0 → State 2 if Period time=0, Period data≠0, and
    Pulse Width data=0
State 0 → State 3 if Period time=0 and Period data=0
State 1 → State 2 is always
State 2 → State 0 is always
State 3 → State 1 if Period data≠0 and Pulse Width data≠0
State 3 → State 2 if Period data≠0 and Pulse Width data=0
State 3 → State 3 if Period time=0
```

Therefore, it can be seen that the combination of the instruction memory 24 and state machine controller 14 provides for an efficient but programmable system as to certain variables.

The individual components forming micro-sequencer apparatus 10 are known in the art, though their combination and functions within the combination are new.

This concludes a description of an example of operation in which the invention claimed herein is used to advantage. Those skilled in the art will bring to mind many modifications and alterations to the example prescribed herein without departing from the spirit and scope of the invention. Accordingly, it is intended that the invention be limited only by the following claims:

What is claimed is:

1. A micro-sequencer apparatus comprising:
   a state machine controller (14) for storing a plurality of states and identifying a state as a current state with current state instruction;
   a program counter (20) for receiving said current state and producing a program count based thereon identifying a location of associated instruction;
   an instruction memory (24) for storing a plurality of instructions and for receiving said program count to identify one set of said instructions as a current instruction set, said instruction memory being reprogrammable;
   a processor (30) for performing functions of said current instruction set and for producing an output;

next state decoder (32) containing a plurality of branch conditions for receiving said current state and said output to determine branching to one of said plurality of states as a next state and transferring same to said state machine controller (14); and an instruction decoder (28) receiving said current instruction set for decoding said current instruction set for said processor (30).

2. A micro-sequencer apparatus as set forth in claim 1 including a state register (16) for storing said current state from said state machine controller (14).

3. A micro-sequencer apparatus as set forth in claim 2 including a state decoder (18) connected to said state register (16) to decode said current state for use by said program counter (20).

4. A micro-sequencer apparatus as set forth in claim 3 including a program count register (22) for storing said program count from said program counter (20) for use by said instruction memory (24).

5. A micro-sequencer apparatus as set forth in claim 1 including an instruction register (26) connected to said instruction memory (24) for storing said current instruction set and sending said current instruction set to said instruction decoder (28).

6. A micro-processor apparatus as set forth in claim 1 including a thread counter (12) for identifying one of a plurality of threads as a current thread, said state machine controller (14) storing a plurality of states for each thread and said instruction memory (24) storing a plurality of instruction for each of said threads.

7. A micro-sequencer apparatus as set forth in claim 6 wherein said processor (30) includes at least one register and arithmetic unit which are used to process a plurality of threads.

8. A method of sequencing instructions, the method including the steps of:

storing a plurality of states;

identifying one of the states as a current state;

producing a program count based on the current state identifying a location of associated instruction;

storing a plurality of instructions which storing may be reprogrammed;

identifying one set of the instructions as a current instruction set based on the program count;

decoding the current instruction set;

performing functions of the current instruction set and producing an output; and determining a next state from the plurality of states based on the result and the current state.

9. A method as set forth in claim 8 including the step of storing the current state.

10. A method as set forth in claim 9 including the step of decoding the current state.

11. A method as set forth in claim 10 including the step of storing the program count.

12. A method as set forth in claim 11 including the step of storing the current instruction set.

13. A method as set forth in claim 1 including the step of identifying one of a plurality of threads as a current thread.

14. A method as set forth in claim 13 including the step of storing a plurality of states for each thread and storing a plurality of instructions for each thread.

15. A method as set forth in claim 14 further including the step of each thread performing functions in at least one shared register and arithmetic unit.

16. A micro-sequencer apparatus comprising:

a state machine controller (14) for storing a plurality of states and identifying a state as a current state with current state instruction;

a program counter (20) for receiving said current state and producing a program count based thereon identifying a location of associated instruction;

an instruction memory (24) for storing a plurality of instructions and for receiving said program count to identify one set of said instructions as a current instruction set, said instruction memory being re-programmable;

a processor (30) for performing functions of said current instruction set and for producing an output;

next state decoder (32) containing a plurality of branch conditions for receiving said current state and said output to determine branching to one of said plurality of states as a next state and transferring same to said state machine controller (14); and a thread counter (12) for identifying one of a plurality of threads as a current thread, said state machine controller (14) storing a plurality of states for each thread and said instruction memory (24) storing a plurality of instruction for each of said threads.

17. A method of sequencing instructions, the method including the steps of:

storing a plurality of states;

identifying one of the states as a current state;

producing a program count based on the current state identifying a location of associated instruction;

storing a plurality of instructions which storing may be reprogrammed;

identifying one set of the instructions as a current instruction set based on the program count;

performing functions of the current instruction set and producing an output;

determining a next state from the plurality of states based on the result and the current state; and identifying one of a plurality of threads as a current thread.

* * * * *